Nov. 24, 1942.   D. M. LARDI   2,303,055
LAWN MOWER
Filed Dec. 2, 1940   2 Sheets-Sheet 2
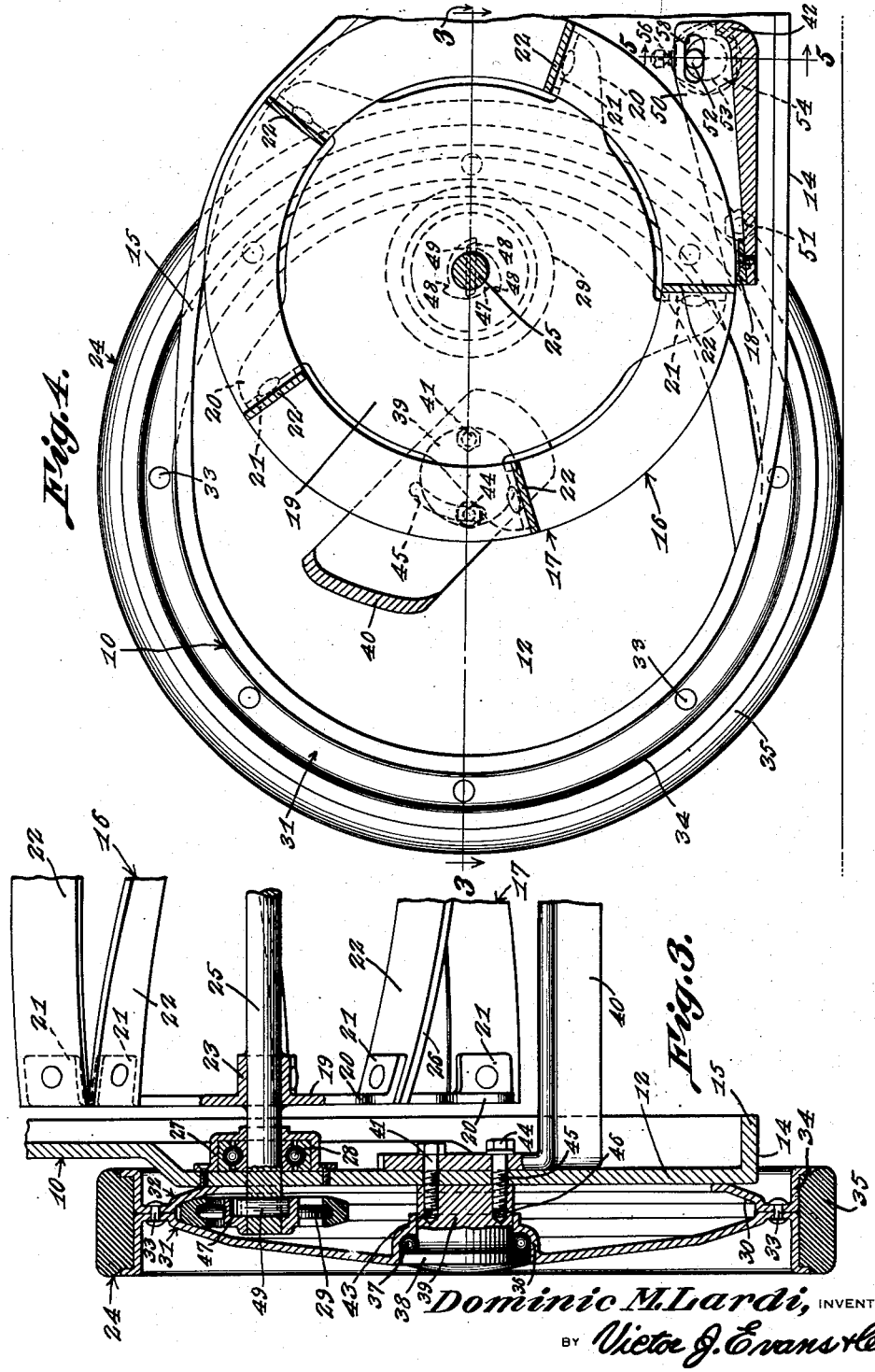
Dominic M. Lardi, INVENTOR
BY Victor J. Evans & Co.
ATTORNEYS Patented Nov. 24, 1942

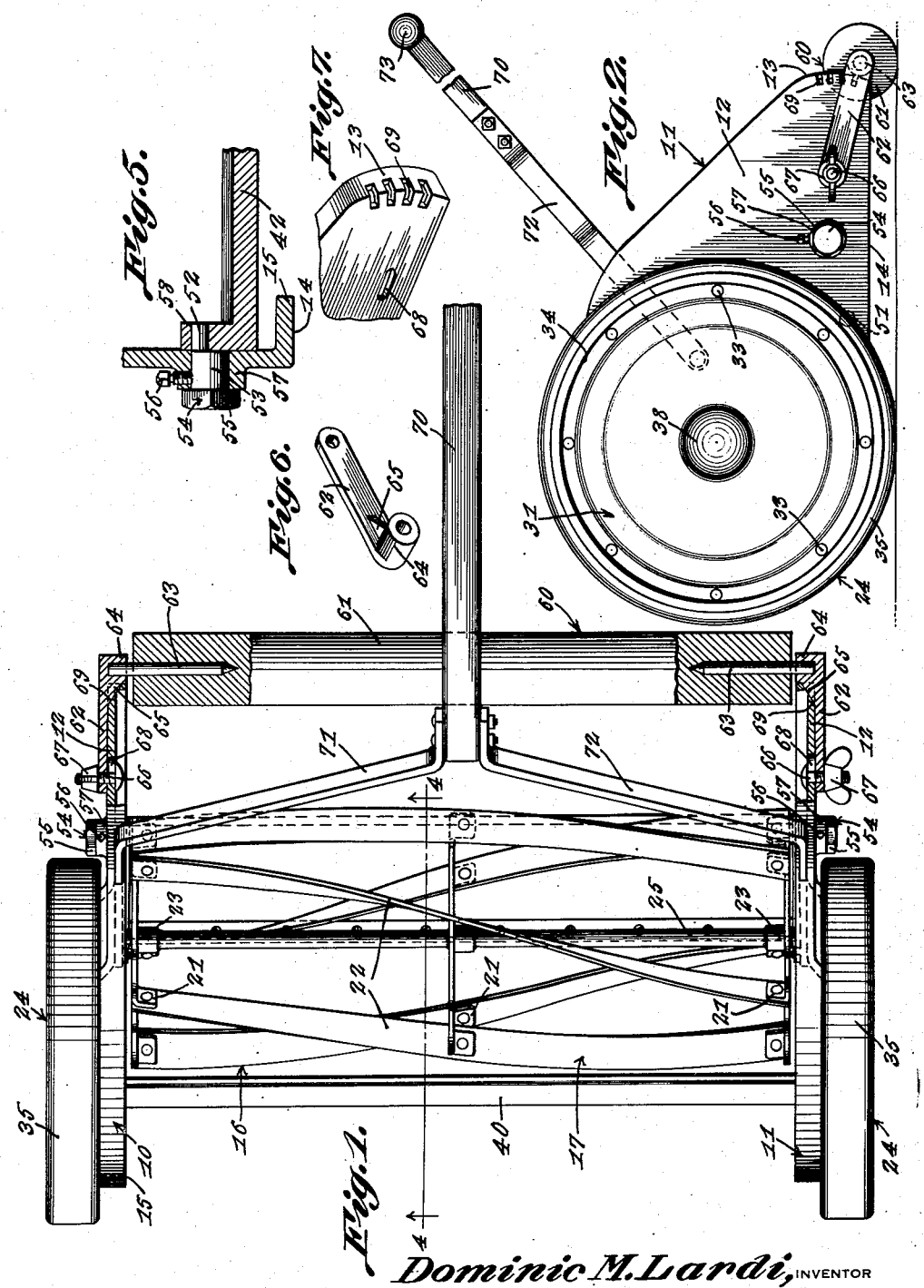

2,303,055

UNITED STATES PATENT OFFICE 2,303,055

LAWN MOWER

Dominic M. Lardi, Canaan, Conn.

Application December 2, 1940, Serial No. 368,275

2 Claims. (Cl. 56—249)

My invention relates to new and useful improvements in lawn mowers.

An important object of my invention is the provision of a lawn mower that is unique in its construction to promote lightness in weight and an essentially quiet operation.

Another object of my invention is the provision of a lawn mower wherein substantially all of the parts comprising the same may be stamped and fashioned from sheet metal and wherein only a few parts comprise castings or other relatively heavy parts.

Still another object of my invention is the provision of a lawn mower of the above-mentioned character which, by reason of the sheet metal construction, may be inexpensively manufactured in large quantities with great speed and precision.

Yet another object of my invention is the provision of a lawn mower of the above-mentioned character which includes simple and unique means for adjusting the coacting parts relative to each other and for properly maintaining the lawn mower in an operative condition at all times.

Other objects and advantages of my invention, will be apparent during the course of the following description.

In the drawings, forming a part of this specification, and wherein like numerals are employed to designate like parts throughout the same, Figure 1 is a top plan view of a lawn mower constructed in accordance with the present invention, Figure 2 is a side elevation thereof, Figure 3 is a longitudinal sectional view taken on the line 3—3 of Figure 4, Figure 4 is a fragmentary transverse sectional view taken on the line 4—4 of Figure 1, Figure 5 is a fragmentary vertical sectional view taken on the line 5—5 of Figure 4, Figure 6 is a perspective view of one of the arms comprising a part of the rear roller assembly, and Figure 7 is a fragmentary perspective view of the rear vertical edge of one of the side walls of the supporting frame.

In the accompanying drawings, wherein for the purpose of illustration, is shown a preferred embodiment of my invention, the numerals 10 and 11 designate identical vertically disposed side walls comprising a part of a supporting frame of the lawn mower. Each of the side walls comprises an essentially flat plate 12 having an enlarged forward end, a rearwardly and downwardly inclined upper edge that curves sharply at the rearward end thereof to merge with the substantially small arcuately curved vertical rear edge 13, and a bottom edge 14 that is substantially straight for its entire length. The entire periphery of each of the walls is provided with an inturned flange 15 and the side walls themselves are arranged in spaced parallel relation with each other and with the peripheral flange 15 extending inwardly.

A cutter 16, operating in a conventional manner, is mounted for rotation between the side walls. The cutter includes a rotary cutting reel 17 and a stationary cutting blade 18, the relationship and coaction between these cutter parts being more fully set forth in a later part of the specification.

One important feature of this invention resides in the fact that substantially all of the parts may be stamped from a metal sheet and easily fashioned into the respective pieces. For instance, the end walls may obviously be stamped from a piece of sheet metal and the flange 15 turned in the manner indicated. It is my thought to also make the reel 17 from suitably stamped and pressed connected parts.

The ends 19 of the reel are identical, each comprising an essentially disk-shaped piece of metal having radially extending ears 20 spaced circumferentially therearound. Each of the ears is provided with a laterally extending lug 21 preferably formed integral therewith to which the blades 22 may be riveted, or otherwise secured. The blades are each provided with a beveled sharpened outer edge 26 and each is spirally applied to the ends in the conventional manner. As best illustrated in Figure 3, the ends are formed centrally with a hub 23 which receives the arbor 25. The opposite ends of the arbor extend beyond the end disks and through the end walls 10 and 11 of the frame. As best illustrated in Figure 3, a bearing cup 27 is mounted on the inner side of each of the end walls 10 and 11 to receive the arbor 25. The cup encloses a roller bearing 28 which supports the portion of the arbor passing through the end walls for free independent rotation. The arbor ends extend beyond the side walls of the frame and each carries a driven pulley 29 which frictionally engages the inner annular channel or recess 30 in the traction wheels 24.

Each wheel is identical in its construction and each is also adapted to be fashioned from sheet metal, or the like. I have, therefore, provided superposed inner and outer plates 31 and 32 held together by an annular series of rivets 33 arranged adjacent the peripheries thereof. The portion of each of the plates extending circumferentially beyond the pivots is bent outwardly in a direction away from each other to provide a supporting rim 34 adapted to seat the rubber tire 35. The edge of each of the portions comprising the rim is turned outwardly to engage the sides of the tire and to hold the same securely fitted to the wheel. The portion of the inner plate 32 extending circumferentially inwardly from the rivets forms the inner wall of the track or recess 30, and is, therefore, bent angularly laterally from the outer companion plate 31. The portion of the inner plate extending inwardly from the series of rivets is essentially small, having just sufficient length to contact the outer surface of the side wall and to bear thereagainst in a manner to support and steady the wheel. The portion of the outer plate 31 extending within the series of rivets 33 covers considerably more area than the inner plate 32 and is centrally provided with an inwardly extending integral hub 36. The hub includes a curved portion which constitutes a race for the ball bearings 37 held in place by the enlarged head 38 of the stub shaft 39. The portion of the plate 31 immediately inwardly from the series of rivets is bent angularly outwardly to form the outer wall of the track 30 and it preferably continues to incline outwardly in a manner to provide ample room for the pulley 29 and to permit contact only between the tapered periphery of the pulley and the track 30.

A control bar 40 extends between the end walls of the frame forwardly of the cutter 16 and the ends of the bar are bent angularly to extend along the inner faces of the walls. A bolt 41 extends through an opening in each end of the rod, through the respective adjacent side walls and into the eccentrically located screw-threaded bore 43 in the inner end of the stub shafts 38. A second bolt 44 extends through an inner opening in each end of the rod, through an elongated arcuate slot 45 in the end walls of the frame and into a screw-threaded bore 46 provided in the inner end of the stub shafts in diametrically opposed relation to the bore 43. The bolts 41 and 44 will act to securely hold the stub shafts abutting the outer faces of the end walls and the stub shafts, in turn, rotatably support the traction wheels 24. The bar 40 actually has a double purpose. It operates as a bumper to protect the cutter 16 and also as a single control means for regulating the degree of frictional engagement of the driven pulley 29 with the track 30 of the traction wheels. Obviously, if the bolt 44 is loosened and the bar 40 moved in one direction to cause the same to pivot about the bolt 41 and to cause the bolt 44 to move within the slot 45, each of the traction wheels will be simultaneously moved away from the coacting peripheral portion of the pulleys 29. If, on the other hand, the bar is pivoted in the opposite direction, the eccentric mounting of the pivot bolt 41 will cause the tracks to simultaneously move toward the pulleys in a manner to cause the tracks to more snugly and tightly grip the coacting surfaces of the pulleys.

As illustrated in Figures 3 and 4, the pulleys are each provided with an inner recess 47 the arcuately curved side wall of which is provided with circumferentially spaced radial seats 48 which engage the opposite ends of the pin 49 slidably mounted transversely of the portion of the arbor 25 extending through the recess. Forward rotation of the traction wheels will, by reason of frictional engagement of the pulley in the track 30, cause the seat supporting the pin 49 to effect positive rotation of the arbor, and, consequently, of the cutting reel 17. If, however, the traction wheels are reversely rotated the pin 49 may shuttle back and forth within the recess 47 and ratchet freely over the seats 48 in a manner whereby no rotary motion will be imparted to the cutting reel.

A plate 42 extends between the side walls 10 and 11 of the frame below and rearwardly of the cutting reel and the blade 18 is mounted on the forward end thereof in operative association with the blades of the reel 17. The opposite ends of the plate 42 are provided with upstanding flanges 50 and a pivot pin 51 extends through the end wall of the frame and into the flanges adjacent the forward end thereof but rearwardly of the blade 18. The rearward end of the plate is supported by the eccentric shank portion 52 of the adjusting bolt 53 mounted for rotation in the side walls. Each of the adjusting bolts is provided with an enlarged head 54 having angularly related wrench receiving faces 55 and a set screw 56 is adjustably carried by the outwardly extending annular flange 57 of the wall. The shank 52 is movable in an elongated slot 58 in the plate flanges whereby retraction of the set screws will permit the adjusting bolts to be rotated and the eccentric motion thus given the shank 52 will cause the plate to rock about the horizontal pivot pins 51. Obviously, pivoting of the plate in the above manner will move the blade 18 toward or away from the blades of the cutting reel and, when the same has been operatively associated with the blades of the reel, the set screws 56 may be tightened to hold the same in the selected adjusted position.

The rearward end of each of the side walls extends substantially beyond the wheels and cutter and a roller assembly 60 is carried thereby to keep the frame from dragging along the surface of the ground. The roller assembly comprises a cylindrical roller member 61 freely rotatable about the pins 63 carried by the arms 62 arranged at the opposite ends of the side walls 10 and 11. As best illustrated in Figure 6, each of the arms includes, at its roller engaging end, a laterally extending hub 64 and an essentially triangular-shaped integral web 65 extends between the hub and the inner surface of the arm. The distal ends of the arms extend in embracing relation with the side walls and the bolt and wing nut 66 and 67 connect the arms to the side walls. The bolts extend through an elongated slot 68 in the frame whereby loosening of the wing nuts 67 will permit the roller assembly to have a limited sliding movement relative to the frame. If the assembly is retracted in the full distance permitted by the slots, the same may freely pivot in a vertical plane independently of the frame; if, however, the assembly is advanced a maximum distance permitted by the slot, the web 65 of the arms will be received within one of the pockets 69 in the outer edge 13 of the end walls. The webs may thus be selectively positioned in any one of the pockets 69 to raise or lower the frame a requisite distance.

The lower end of the handle 70 is provided with bifurcations 71 and 72 which pivotally attach the end walls of the frame and the upper end thereof is provided with a transverse hand bar 73 which the operator may grasp when pushing the mower.

It may thus be seen that, in operation, the stationary blade 18 of the cutter may be easily and accurately adjusted relative to the blades of the rotary reel 17 by the simple expedient of loosening the set screws 56 and rotating the eccentric shank 52 of the adjusting bolts. If the lawn mower is pushed forwardly, the frictional engagement of the pulleys 29 in the track 30 of the traction wheels will effect rotation of the cutting reel. The degree of frictional engagement with the pulley within the track is regulated by the bar 40 which also, by reason of its position forwardly of the cutter, will operate as a bumper to protect the blades of the reel. If, however, the lawn mower is moved in a reverse direction the pin 49 will permit the traction wheels to move freely independently of the cutter. The angle assumed by the frame relative to the ground may be easily regulated by loosening the wing nut 67 and positioning the web 65 in a selected one of the pockets 69.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In mechanism for adjusting the wheels of a lawn mower with relation to driven pulleys engaging the interior periphery thereof, a bar extending between the sides of the mower having end portions arranged parallel and adjacent the said sides, a pivot element extended through each end bar portion and mower side and eccentrically into the supporting shaft member of the wheel, each of the mower sides having an arcuate slot arranged concentrically of the said pivot elements, a projection fixed eccentrically on the wheel shaft member and extending through the said slot and through an opening in the end portion of the control bar whereby tilting movement of the control bar will effect adjustment of the wheel with relation to the axis of the pulley.

2. In gear mechanism for a lawn mower of the type having rigid side sections with a shaft member projecting from each side section having a wheel rotatably mounted thereon and a wheel drive pulley in driving relation with the periphery of the wheel, a control bar extending between the said side sections having an end portion parallel with and adjacent each side section, a pivot element extended through each end bar portion and side section and eccentrically into the shaft member, each of the said side sections having an arcuate slot therethrough concentric with the axis of the said pivot element, a projecting element fixed eccentrically on the said shaft member and extending through the said slot and into the end portion of the control bar whereby angular tilting of the said control bar would effect adjustment of the wheel transversely at the axis of the pulley for varying the frictional engagement of the pulley with the wheel.

DOMINIC M. LARDI.